Dec. 30, 1958     A. B. KAUFMAN     2,866,937
OSCILLOSCOPE VOLTAGE CALIBRATOR
Filed April 6, 1954

INVENTOR:
Alvin B. Kaufman

By Hubert E. Metcalf
His Patent Attorney

United States Patent Office 2,866,937
Patented Dec. 30, 1958

2,866,937
OSCILLOSCOPE VOLTAGE CALIBRATOR

Alvin B. Kaufman, Los Angeles, Calif., assignor to Northrop Aircraft, Inc., Hawthorne, Calif., a corporation of California Application April 6, 1954, Serial No. 421,410

3 Claims. (Cl. 324—121)

This invention relates to oscilloscope voltage calibrators, and more particularly to circuitry arrangements and components for a new and useful instrumentality for measuring electrical values of voltages when viewed on the screen of a cathode-ray tube associated with an oscillograph.

With the advent of oscilloscope voltage calibrators, the measurement of the voltage amplitude of observed oscillograph patterns has been vastly simplified. However, in the opinion of the inventor of the device described herein, the commercial units which are available on the market are not completely satisfactory in performance.

Revealed, herewith, in the present invention, is a simplified oscilloscope voltage calibrator which has certain desirable and novel circuitry not found in previously provided devices and yet is inexpensive in design components.

A prerequisite in the design of an oscilloscope voltage calibrator is that its referenced output should remain accurate over a wide range of A. C. line voltage variation. The circuitry described herein meets this requirement. With this calibrator, the line voltage may vary from 90 to 135 volts without any visible shift of the calibrating pattern on the oscilloscope.

All commercial calibrators are designed to produce a square wave at line frequency. Thus, ignoring any tilt of the pattern due to poor low frequency response in the oscilloscope, the peak-to-peak value of the pattern (at 60 C. P. S.) is used to determine the signal level. Where the frequency of the signal to be calibrated is considerably above the line frequency, the oscilloscope gain may have fallen off, and the low frequency calibration may not be accurate unless a scope-frequency correction factor is employed. Furthermore, there is always the nuisance of adjusting the sweep frequency down from the test frequency to line frequency in order to secure a locked pattern.

In order to calibrate at the same frequency as the signal to be calibrated, the invention described has provisions for injection of a signal frequency voltage, between 1 C. P. S. and 20,000 C. P. S., which sets the output frequency of the calibrator. An injected frequency calibrating voltage level between approximately 6 and 120 volts R. M. S. is required. The load on the signal source is 1 megohm and may in general be secured from some section of the circuit under test, with negligible shunting or loading effect.

The circuitry of the device relies in part on the constant-current characteristics of a pentode with fixed screen excitation. Basicly, the circuitry consists of a pentode which is driven alternately between cutoff and plate current saturation. It is apparent from the plate current curve of a pentode that for a fixed bias the plate current of the tube is substantially independent of plate voltage variation (if over 50–100 volts), and that a plate load resistor would develop an output voltage independent of everything except screen voltage.

Since the plate current curves of a pentode tube are almost, but not quite flat, a variation of about 5% in the output voltage with change of plate voltage over the specified A. C. line voltage range must be corrected. Thus, it is necessary to regulate both the plate and screen voltage. Almost all voltage regulation systems employ a gaseous regulator tube either for direct control or as a reference control. As the current drawn by the pentode clipper is only a few milliamperes, there is no need for a complicated voltage regulator, a VR tube being directly applicable.

Accuracy of the voltage calibrator is directly proportional to the screen and plate voltage regulation. An OB2 VR tube has an operating voltage of 105 volts, its regulation is 1 volt, or slightly better than 1%. Potentiometer loading error, however, causes the output potentiometer to be nonlinear by approximately 3%. This causes a possible over-all error of 4%. Potentiometer loading error occurs because the load resistor (the output multiplier) shunts the output resistance of the potentiometer so that a given rotation no longer represents a proportional resistance and voltage output, and error is towards reduced output. To compensate for this error a simple mathematical correction may be made in the potentiometer dial reading when utmost accuracy is required, the equation being known to the art.

The practical application of the present invention for calibrating the voltage amplitude of a signal in conjunction with an oscillograph, is well known to those who are familiar with the art.

It is the object of the present invention to provide a simplified, faster and more accurate calibration means for the determination of the amplitude of a signal observed on the screen of a cathode-ray tube in an oscillograph.

Another object of the invention is to provide a voltage calibrating circuit in which the reference output calibrating voltage is accurate over a wide range of A. C. line voltage variation.

A further object is to provide for voltage calibration at the signal frequency.

Another object is to provide an oscilloscope voltage calibrator in which heater voltage variation does not have an appreciable effect on amplitude of calibrating voltage as such variation causes only minor changes in the plate current saturation and cutoff points.

Briefly stated the invention comprises an oscilloscope calibrating device for producing square wave calibrating voltages in which a constant peak-to-peak voltage output level is maintained at the frequency of the signal to be calibrated despite variations in voltages supplied thereto.

Other more specific objects and features of the invention will appear from the following detailed description, having reference to the accompanying drawings:

Figure 1:
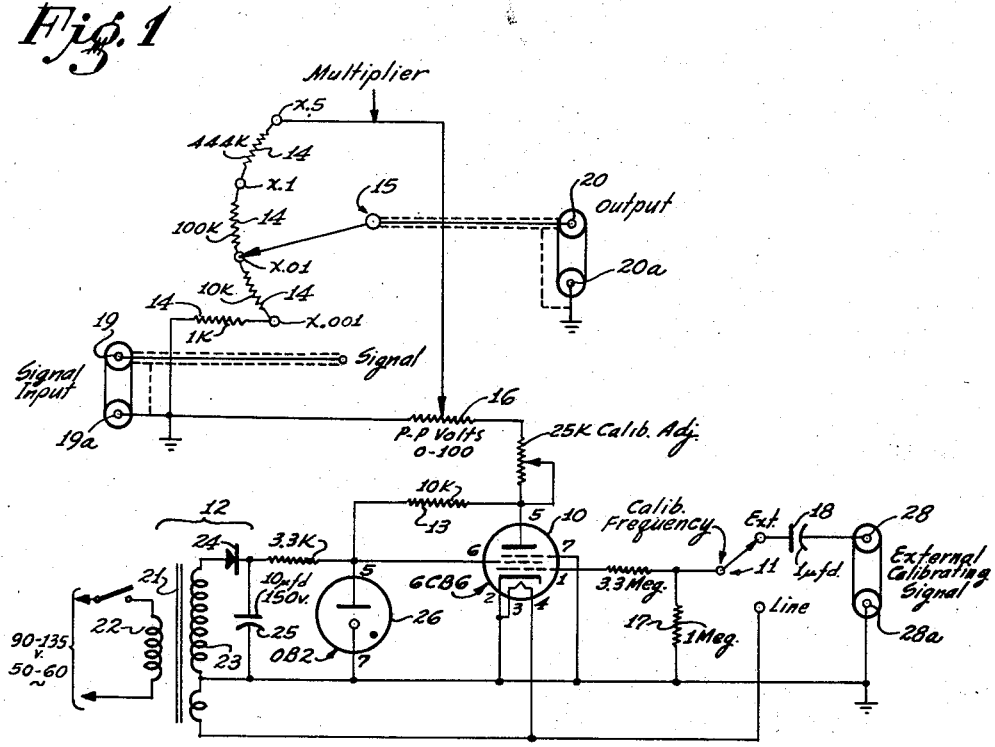
Figure 1 is a diagram of the circuit of the invention.

Referring to Figure 1, the electrical circuitry embodies a clipping tube 10 functioning as an overdriven voltage amplifier obtaining its grid drive voltage from a signal source selected by a two position throw switch 11. The plate of tube 10 is returned to a positive voltage through a plate load resistor 13. The output network is connected between the plate and cathode of tube 10 and consists of multiplier resistors 14, the output of each increment being selected by throw switch 15 and quantitatively adjustable by variable resistor 16.

Bias for the control grid of tube 10 is obtained in part from the grid coupling resistor 17 and in part from the capacitance 18 which becomes charged as a result of grid current flow in tube 10 during a portion of the input signal.

Throw switch 15, when thrown to a certain position, connects the input signal terminal 19 directly to the output terminal 20.

The source of positive voltage is obtained from a transformer 21 having a primary winding 22 and a 1 to 1 ratio secondary winding 23, one side of which is connected to a selenium cell rectifier 24, and filtered by means of capacitor 25. A substantially steady positive voltage is obtained by connecting a voltage regulator tube 26, of proper voltage regulating characteristics, at the plate and screen source of positive voltage.

The symbols and values as indicated in the circuitry diagram of Figure 1, are a preferred form of the invention.

Figure 2:
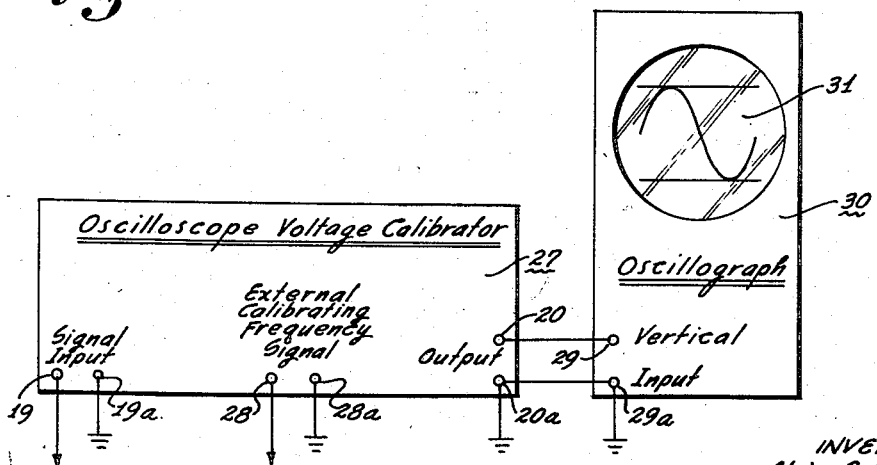
Figure 2 is a block diagram of the application of the circuit of the invention to an oscillograph.

In determining, for example, the peak-to-peak value of a signal voltage, the oscilloscope voltage calibrator of the present invention is set up in a conventional manner as indicated in the block diagram of Figure 2.

Referring to Figure 2, the alternating signal voltage to be calibrated is applied to the input terminals 19 and 19a of the calibrator 27 and a frequency sample of the signal voltage between 6 and 120 volts is applied to terminals 28 and 28a. The output terminals 20 and 20a are then connected to the vertical input terminals 29 and 29a of an oscillograph 30 and the signal pattern observed on the screen 31 of the cathode-ray tube.

The signal pattern is adjusted to a marker on the screen 31 and, subsequently, instead of the signal voltage, the calibration voltage is switched to the oscillograph, which is adjusted until the calibration voltage pattern is tangent with the adjusted marking line. The amplitude of the calibration voltage as read on the increment and dial position of the calibrator then corresponds to the peak-to-peak value to be determined.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An oscilloscope voltage calibrator, comprising: a pentode tube for operating as a limiter amplifier, means for operatively applying a constant-value source of D. C. potential across the screen grid and cathode of said pentode, a resistance connected between the screen grid and anode of said pentode, input circuit means connected between the control grid and cathode of said pentode, calibrating input terminal means connected to said input circuit means for applying an A. C. signal whose peak-to-peak amplitude is to be measured to said input circuit means to provide a substantially square wave calibrating output from said limiter amplifier at a known peak-to-peak amplitude, a fixed-resistance output potentiometer connected in an output circuit between the anode and cathode of said pentode, the continuously movable tap of said output potentiometer cooperating with a calibrated dial and pointer, a plurality of series attenuator resistances connected between said potentiometer tap and said cathode, a multiple-contact selector switch having the junctions between said series attenuator resistances connected to respective contacts thereof, the pole of said selector switch being connected to an output terminal of said voltage calibrator, and a signal input terminal of said voltage calibrator connected to another separate contact of said selector switch and adapted to have said A. C. signal to be measured connected thereto, whereby an oscilloscope connected to said output terminal can be used to measure the peak-to-peak amplitude of said A. C. signal at said signal input terminal by visual comparison with the calibrated variable flattened output voltage of the same frequency from said calibrator when said A. C. signal is also fed to said input circuit means of said calibrator at an amplitude above the threshold of limiting.

2. An oscilloscope voltage calibrator, comprising: a pentode tube for operating as a limiter amplifier, means for operatively applying a constant-value source of D. C. potential across the screen grid and cathode of said pentode, a resistance connected between the screen grid and anode of said pentode, input circuit means connected between the control grid and cathode of said pentode, terminal means for applying an A. C. signal whose peak-to-peak amplitude is to be measured to said input circuit means, a fixed-resistance output potentiometer connected in an output circuit between the anode and cathode of said pentode, the movable tap of said output potentiometer cooperating with a calibrated dial and pointer, a plurality of series attenuator resistances connected between said potentiometer tap and said cathode, a multiple-contact selector switch having the junctions between said series attenuator resistances connected to respective contacts thereof, the pole of said selector switch being connected to an output terminal of said voltage calibrator, and a signal input terminal of said voltage calibrator connected to another separate contact of said selector switch and adapted to have said A. C. signal connected thereto, whereby an oscilloscope connected to said output terminal can be used to measure the peak-to-peak amplitude of said A. C. signal by visual comparison with the calibrated variable flattened output voltage of the same frequency from said calibrator when said A. C. signal is also fed to the grid circuit of said calibrator at an amplitude above the threshold of limiting, said calibrator being powered from normal A. C. power lines, and including separate selector means for feeding a line frequency signal to the input of said pentode limiter to the exclusion of said A. C. signal whose amplitude measurement is desired, whereby comparisons of calibrator output can also be made between waveforms at signal frequency and at line frequency.

3. An oscilloscope voltage calibrator, comprising: limiter amplifier means for producing a known constant peak-to-peak flattened output wave having a frequency equal to that of an A. C. signal whose peak-to-peak amplitude is to be measured, a power transformer for operating said voltage calibrator from A. C. power at line frequency, a rectifier, filter, and voltage regulator means connected to a secondary winding of said power transformer to produce a constant source of D. C. potential for operation of said limiter amplifier means, an additional unrectified secondary winding on said transformer, said limiter amplifier means having an input circuit with calibrating input terminals adapted to have the A. C. signal connected thereto, means connected to the output of said limiter means to provide calibrated voltage divisions of said output wave, means for selectively and alternately connecting said A. C. signal to be measured and any of said voltage divisions to an output terminal for presentation on an oscilloscope, a two-position selector switch having the pole thereof connected to the limiter side of said input circuit, one of said calibrating input terminals being operatively coupled to one position contact of said selector switch for applying said A. C. signal to said limiter input circuit when said selector switch is in a first position, and means for applying A. C. voltage from said additional secondary winding to said limiter input circuit when said selector switch is in a second position, said signal and voltage fed to said limiter input circuit being strong enough to cause limiting action of said limiter amplifier means, whereby a peak-to-peak calibrating voltage from said limiter means can be obtained at A. C. signal frequency or at power line frequency as desired.

References Cited in the file of this patent

UNITED STATES PATENTS

| | | |
|---|---|---|
| 2,235,173 | Shepard | Mar. 18, 1941 |
| 2,291,648 | Rider et al. | Aug. 4, 1942 |
| 2,482,803 | Smith et al. | Sept. 27, 1949 |
| 2,550,816 | Jackson | May 1, 1951 |
| 2,563,395 | Carpentier | Aug. 7, 1951 |

OTHER REFERENCES

Article by Charles Markey and H. L. Polak, published in Electronics, November 1949, pages 193, 195 and 197. Copies available in Scientific Library and 324–130.

"Encyclopedia on Cathode Ray Oscilloscopes and Their Uses" (Rider), published by Rider, 1950; page 548, Fig. 15–68, and page 505, Fig. 14–16 relied upon. Copies available in Scientific Library and Div. 69.